United States Patent Office 3,436,431
Patented Apr. 1, 1969

3,436,431
OLEFIN PRODUCTION
John Paton Candlin and William Henry Janes, Runcorn, England, assignors to Imperial Chemical Industries Limited, London, England, a corporation of Great Britain
No Drawing. Filed Apr. 4, 1966, Ser. No. 539,744
Claims priority, application Great Britain, May 13, 1965, 20,274/65; Sept. 20, 1965, 39,986/65
Int. Cl. C07c *11/18, 11/16*; C07f *15/00*
U.S. Cl. 260—666                     10 Claims

ABSTRACT OF THE DISCLOSURE

A process for converting one or more dienes to higher molecular weight ethylenically unsaturated material by contacting the dienes with a carbonyl nitrosyl of a metal of Group VIII of the Periodic Table, e.g., iron dicarbonyl dinitrosyl.

---

This invention relates to the production of olefins and more particularly to their production from dienes of lower molecular weight, e.g., by dimerisation or oligomerisation.

The dimerisation of dienes such as butadiene and isoprene is well known. For example, butadiene may be dimerised thermally at temperatures in excess of 150° C. and under autogenous pressure or by contact with certain metal complexes under somewhat less forcing conditions. Both processes tend to yield mixtures of products which require expensive separation where a single pure compound is required. We have now found a process for converting dienes to higher molecular weight hydrocarbons which is more specific in nature.

According to the present invention we provide a process which comprises contacting a diene of the structure

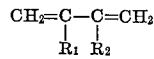

wherein $R_1$ and $R_2$ area each selected from hydrogen atoms, chlorine atoms and monovalent hydrocarbon radicals, with a metal complex which is a carbonyl-nitrosyl of a metal of Group VIII of the Periodic Table.

This process is remarkable both for its specificity and because it can be operated to give high yields even in the presence of normally undesirable impurities such as water and mono-ethylenically unsaturated compounds, e.g., ethylene.

While our process may be used generally for the transformation of dienes of the kind having the structure defined above, e.g., butadiene, isoprene and chloroprene, it is particularly useful for the production of 4-vinylcyclohexene from butadiene and of 1,4-dimethyl- and 2,4-dimethyl-4-vinylcyclohexenes from isoprene. Mixtures of our specified dienes may also be reacted to give mixed co-oligomers, generally co-dimers, if desired.

The catalysts for the process are coordinated complexes of Group VIII metals, and particularly of metals falling in the first two vertical columns of Group VIII, in which the coordinated groups include at least one carbonyl (CO) group and at least one nitrosyl (NO) group. Other groups may also be coordinated with the metal atom or atoms, if desired.

Iron dicarbonyl dinitrosyl $Fe(CO)_2(NO)_2$ is particularly specific in its action and generally promotes high conversions. For example, when butadiene is contacted with this compound, 4-vinylcyclohexene may be produced almost quantitatively and at least 99.5% pure; and when isoprene is used, an almost pure 50/50 mixture of 1,4-dimethyl- and 2,4-dimethyl-4-vinylcyclohexenes is obtained. Other catalysts that may be mentioned, however, include cobalt dicarbonyl dinitrosyl and ruthenium dicarbonyl dinitrosyl.

The catalyst is preferably used in amounts of from 0.01 to 10 parts per 100 parts of diene by weight. The use of less than 0.01 part per 100 is generally insufficiently effective while little advantage is gained from using more than 10 parts per 100. Very good results are obtained using from 0.1 to 2 parts per 100.

The reaction may be effected simply by contacting the diene with the metal carbonyl nitrosyl but we have found that the rate of reaction may be improved by thermal or photochemical activation. Contrary to expectation, however, the addition of a Lewis base, e.g., a trihydrocarbyl phosphine or pyridine, to the reaction does not appear to affect the composition of the product.

The optimum reaction conditions depend upon the nature of the diene but there is seldom any advantage in working below room temperature. For example, for isoprene a temperature of at least 40° C. is preferred and particularly good results are obtained using temperatures of from 50° C. to 120° C. For butadiene, on the other hand, while good results are obtained from carefully controlled reactions at temperatures of from 40° C. to 120° C., almost quantitative conversion has been achieved by heating the reaction mixture to 100° C. and allowing it to run away under the exothermal conditions to temperatures of as high as 250° C. for a few minutes before cooling. It is remarkable that the use of such high temperatures in the absence of a polymerisation inhibitor does not lead to large formations of high polymer in place of 4-vinyl cyclohexene.

For photochemical activation, we have found no need to use special light sources such as ultra-violet light for the reaction; ordinary sunlight causes marked increases in reaction rate. For example, with butadiene exposed to sunlight at room temperature, yields equivalent to those obtained from reaction at 40° C. in a metal autoclave may be achieved in half the time.

The pressure at which the process is operated is not critical but it is generally convenient to operate at atmospheric pressure or, more usually, at the autogenous pressure of the diene at the operating temperatures within the temperature ranges given above.

The process may be effected with the diene alone or dissolved in a suitable organic solvent. While this is generally a hydrocarbon (for example n-heptane) the nature of the solvent is not as critical as in the previously described processes for dimerising dienes. For example, we have found that butadiene may be converted almost entirely to 4-vinylcyclohexene-1, even in the presence of substantial quantities of acrylonitrile or ethylene. We have also found that the presence of water may be tolerated although it is preferable to operate anhydrously or substantially anhydrously. On the other hand, it is preferred to operate the process under an inert atmosphere, e.g., of nitrogen or of the diene to be transformed, because the catalysts may be prone to oxidation.

The time required for obtaining satisfactory yields depends upon the nature of the diene, the temperature, the pressure and the choice of catalyst; in general, the use of higher temperatures and pressures results in shorter reaction times. For any combination of temperature and pressure there is generally an optimum period of time beyond which the formation of high polymers and other undesirable by-products in substantial quantities may occur. Suitable reaction times may be found readily by simple experiment but in general times of a few minutes to 6 hours are required for the conditions described above.

The process of our invention may be effected readily by introducing the catalyst into a closed vessel which has previously been flushed with an inert gas, e.g., nitrogen or argon, adding the diene and then heating the closed vessel for the required time. Since the catalysts are often thermally unstable, it is preferred to cool the vessel, generally below 0° C., before adding the catalyst.

After the reaction, the product may be recovered in any suitable manner, e.g., by distillation, and then purified.

The products of our process may be used as components in polymerisations or as chemical intermediates; they generally contain active unsaturation. The 4-vinylcyclohexene-1 obtained from our process is particularly notable for its purity, being generally at least 99.5% pure when prepared from pure butadiene under optimum conditions. For this reason, this material is particularly suitable for conversion to 4-vinylcyclohexene-1,2-epoxide the polymers and copolymers of which are gaining attention in the plastics industry.

The invention is now illustrated by the following examples in which all parts are expressed as parts by weight. The catalysts used in all the examples described below were prepared using the route outlined in "Zeit. fur Anorganische und Allgemeine Chemie" 320, 101 (1963) by W. Hieber and H. Beutuer.

EXAMPLE I 1.0 part of iron dicarbonyl dinitrosyl was introduced under a nitrogen atmosphere into an autoclave previously cooled to a temperature below 0° C. 100 parts by weight of liquid butadiene were then added and the vessel was closed and heated to 100° C. for 3 hrs. Chromatography showed that the only product was 4-vinylcyclohexene-1- and this was obtained in 70% yield.

A repeat experiment in the absence of the metal complex yielded no 4-vinylcyclohexene-1.

EXAMPLE II

The process of Example I was repeated at 40° C. for 6 hours to yield 61% of 4-vinylcyclohexene-1 of 100% purity.

EXAMPLE III

The process of Example I was repeated using 0.2 part of the catalyst. The yield of pure 4-vinylcyclohexene-1 was 43%.

EXAMPLE IV

The process of Example I was repeated using 100 parts of isoprene in place of butadiene. After 5 hours at 100° C. 75% of the diene was converted, to oligomers. 95% of them consisted of 4-vinyl-2,4-dimethylcyclohexene-1 and 4-vinyl-1,4-dimethylcyclohexene-1 in approximately equal amounts and higher oligomers constituted the remaining 5% by weight.

By way of comparison, a repeat experiment at 60° C. for 160 minutes in the absence of the metal complex yields about 7 parts of product which consists of 2-methyl-4-isopropenylcyclohexene-1, traces of 1-methyl-4-isopropenylcyclohexene-1 and also trimers and high polymer.

EXAMPLE V 0.5 part of iron dicarbonyl dinitrosyl was introduced under a nitrogen atmosphere into an opaque autoclave previously cooled to a temperature below 0° C. 50 parts of liquid butadiene and 50 parts of isoprene were added and the vessel closed and heated to 100° C. for 4 hours. 90% conversion was achieved and the product comprised 50% by weight of 4-vinylcyclohexene-1, 45% by weight of a mixture of 1-methyl- and 2-methyl-4-vinylcyclohexene-1 and 5% of other co-dimers.

EXAMPLE VI

The process of Example V was repeated using 50 parts of chloroprene in place of the isoprene. 15% conversion was achieved and two thirds of the product consisted of chloro-4-vinylcyclohexene-1 isomers.

EXAMPLE VII 1 part of iron dinitrosyl dicarbonyl was introduced under a nitrogen atmosphere into a transparent glass vessel previously cooled below 0° C. 100 parts by weight of butadiene were then added and the vessel was sealed and exposed to bright sunlight at 25° C. for 3½ hours. About 70 parts of a product consisting almost entirely of 4-vinylcyclohexene-1 were obtained.

EXAMPLE VIII

The process of Example VII was repeated but in this case the vessel and its contents were exposed to ultraviolet light from a 100 watt Hanovia lamp at −10° C. for 3½ hours. A product consisting almost entirely of 4-vinylcyclohexene-1 was obtained in good yield.

EXAMPLE IX

The process of Example I was repeated using cobalt dicarbonyl dinitrosyl in place of the iron complex. After 4 hrs. at 100° C., about 15 parts of a product were obtained which after separation from unreacted butadiene was found to consist almost entirely of 4-vinylcyclohexene-1.

EXAMPLE X

About 400 parts of dry butadiene and 3 parts of iron dicarbonyl dinitrosyl were added under an inert atmosphere of nitrogen to a pressure vessel. This was sealed and slowly heated towards 100° C. After 40 minutes, this temperature was attained and a pressure of 200 p.s.i.g. reached. At this point the temperature rose suddenly to 220° C. and pressure rose correspondingly to 4000 p.s.i.g. Cooling was applied almost at once and within 2 minutes the temperature and pressure eased to 120° C. and 80 p.s.i.g. After a further 2 hrs. under these conditions, the vessel was cooled to 25° C. and the product was removed, washed with dilute hydrochloric acid to remove iron residues and steam distilled to separate the dimer from any nonvolatile residues. Approximately 400 parts of substantially pure 4-vinylcyclohexene-1 were recovered.

Without further purification, 216 g. of the 4-vinylcyclohexene-1 together with 300 ml. of methylene chloride and 330 g. of anhydrous sodium carbonate were added to a 2 litre flanged flask fitted with a stirrer, thermometer and dropping funnel. The slurry so obtained was stirred and cooled to 5–10° C. and to it was added dropwise over a period of about 6 hrs., 372 g. of a solution of peracetic acid containing 40 g. of acid per 100 ml. The temperature of the slurry was kept in the range 5–10° C. at all times. After addition was complete, the frothy slurry was stirred for a further 1 hr. to use up the bulk of the peracetic acid.

500 ml. of water were then added carefully to the well stirred slurry at such a rate as to control the gas evolution and frothing, and a thick cream of inorganic material dispersed in the organic phase was obtained. The latter was carefully poured off and the cream well washed with two lots each of 150 ml. methylene chloride to remove all the product trapped in the inorganic phase.

The extract and the washes were transferred to a separating funnel and washed several times with a saturated neutral solution of ferrous sulphate until two washes remained green, indicating the complete removal of peroxide. The methylene chloride solution was then dried over magnesium sulphate and carefully fractionated to yield 175 g. of 4-vinylcyclohexene-1,2-epoxide distilling at 104° C. at an absolute pressure of 94 mm. of mercury.

EXAMPLE XI 21 parts of butadiene, 0.5 part of iron dicarbonyl dinitrosyl and 0.23 part of pyridine were sealed in a Carius tube and heated to 100° C. for 5 hrs. 70% yield of 4-vinylcyclohexene-1 was obtained.

We claim:
1. A process for converting to higher molecular weight ethylenically unsaturated material at least one diene having the structure $CH_2=CR_1-CR_2=CH_2$, where $R_1$ and $R_2$ are each selected from hydrogen atoms, chlorine atoms and monovalent hydrocarbon radicals, which comprises contacting the diene with a catalyst consisting essentially of a carbonyl nitrosyl of a metal of Group VIII of the Periodic Table.

2. A process according to claim 1 which is effected in the substantial absence of oxygen.

3. A process according to claim 1 in which the metal carbonyl nitrosyl is iron dicarbonyl dinitrosyl.

4. A process according to claim 1 in which the metal carbonyl nitrosyl is used in an amount of from 0.01 to 10 parts per 100 parts of diene by weight.

5. A process according to claim 4 in which the metal carbonyl nitrosyl is used in an amount of from 0.1 to 2 parts per 100 parts of diene by weight.

6. A process according to claim 1 in which the diene is butadiene.

7. A process according to claim 6 which is affected by heating the reaction mixture to 40° C. to 100° C.

8. A process according to claim 7 in which the reaction mixture is heated to 100° C. and allowed to attain a higher temperature by exothermic reaction before cooling.

9. A process according to claim 1 in which the diene is isoprene.

10. A process according to claim 9 which is effected at a temperature of from 60° C. to 120° C.

References Cited

UNITED STATES PATENTS

| | | | |
|---|---|---|---|
| 2,865,707 | 12/1958 | Hogsed | 260—439 |
| 3,377,397 | 4/1968 | Mayfield | 260—666 |

OTHER REFERENCES

Hieber et al.: Zeit. Anorg. Allgem. Chem. 321, pp. 94–106, 1963.

Hieber and Beck, Zeit. Naturforshung Bd. 13B, pp. 194–5, 1958.

DELBERT E. GANTZ, *Primary Examiner.*

V. D. O'KEEFE, *Assistant Examiner.*

U.S. Cl. X.R.

260—348, 439; 204—162